(12) United States Patent  (10) Patent No.: US 7,331,740 B2
Fenton  (45) Date of Patent: Feb. 19, 2008

(54) RAIL GROOMING MACHINE AND METHOD OF USE

(76) Inventor: David S. Fenton, General Delivery, Grovedale, Alberta (CA) T0H 1X0

( * ) Notice: Subject to any disclaimer, the term of this patent is extended or adjusted under 35 U.S.C. 154(b) by 0 days.

(21) Appl. No.: 11/706,759

(22) Filed: Feb. 15, 2007

(65) Prior Publication Data

US 2007/0147969 A1  Jun. 28, 2007

Related U.S. Application Data

(62) Division of application No. 11/280,153, filed on Nov. 16, 2005, now Pat. No. 7,182,557.

(30) Foreign Application Priority Data

Dec. 1, 2004  (CA) ................................... 2487387

(51) Int. Cl.
*B23C 3/00* (2006.01)
(52) U.S. Cl. ...................... 409/178; 409/180; 409/139; 409/201; 409/214; 409/218
(58) Field of Classification Search ................ 409/180, 409/178, 175, 182, 138–140, 201, 296, 297–298, 409/211, 216, 218, 214, 210; 451/347
See application file for complete search history.

(56) References Cited

U.S. PATENT DOCUMENTS

| 4,135,332 A | 1/1979 | Theurer |
| 4,268,196 A | 5/1981 | Harrow et al. |
| 4,416,091 A | 11/1983 | Panetti |
| 4,534,689 A | 8/1985 | Theurer |
| 5,549,505 A | 8/1996 | Jaeggi |
| 5,575,709 A | 11/1996 | Hertelendi et al. |
| 5,735,734 A | 4/1998 | Hertelendi |
| 5,765,975 A * | 6/1998 | Hoffmann et al. .......... 409/138 |
| 6,033,166 A | 3/2000 | Hampel |
| 6,357,094 B1 * | 3/2002 | Sugimoto ................... 409/201 |
| 6,358,140 B1 | 3/2002 | Hempel |
| 6,669,533 B2 | 12/2003 | Huboud-Peron |
| 6,884,010 B1 | 4/2005 | Hosier et al. |
| 7,182,557 B2 * | 2/2007 | Fenton ....................... 409/132 |
| 2005/0198821 A1 | 9/2005 | Reville et al. |

* cited by examiner

*Primary Examiner*—Erica Cadugan
(74) *Attorney, Agent, or Firm*—Davis Bujold & Daniels, P.L.L.C.

(57) ABSTRACT

An apparatus having a mounting body, a support having a first end and a second end. The first end of the support being pivotally secured to the mounting body for pivotal movement about a substantially horizontal primary pivot axis. A rail grooming head mounted to the second end of the support.

9 Claims, 5 Drawing Sheets

RAIL GROOMING MACHINE AND METHOD OF USE

This application is a divisional of U.S. application Ser. No. 11/280,153 filed Nov. 16, 2005, now U.S. Pat. No. 7,182,557, issued Feb. 27, 2007, which claims priority from Canadian Patent Application Serial Number 2,487,387 filed Dec. 1, 2004.

FIELD OF THE INVENTION

The present invention relates to a rail grooming machine that was developed to service rails on a cross beam of a portal crane, and a method of use of the same.

BACKGROUND OF THE INVENTION

Rails on portal crane cross beams tend to wear and get rough after years of heavy loads being run on them. This causes vibration, which accelerates metal fatigue. It also creates an increasingly rough ride for an operator positioned in an operators cab of the portal crane. These rails can be 300 feet long and are very expensive to replace, so a method of servicing them in place is required.

Similar problems relating to servicing rails have been encountered in other industries. Examples of solutions proposed in the prior art include: U.S. Pat. No. 4,135,332 (Theurer 1979) entitled "Rail Grinding Machine"; U.S. Pat. No. 5,575,709 (Hertelendi et al 1996) entitled "Rail Grinding Machine For Grinding Rails Of A Track"; U.S. Pat. No. 5,735,734 (Hertelendi 1998) entitled "Apparatus for Grinding Rails"; U.S. Pat. No. 6,358,149 (Hempel 2002) entitled "Railroad Rail Support For A Grinder"; and U.S. Pat. No. 6,669,533 (Huboud-Peron 2003) entitled "Rail Profile Grinding Machine".

SUMMARY OF THE INVENTION

According to one aspect of the present invention there is provided an apparatus, which includes a mounting body and a support having a first end and a second end. The first end of the support is pivotally secured to the mounting body for pivotal movement about a substantially horizontal primary pivot axis. A rail grooming head mounted to the second end of the support.

According to another aspect of the present invention there is provided a method, including a first step of providing an apparatus as described above. A second step involves securing the mounting body to a trolley which travels parallel to a rail requiring grooming ensuring that the primary pivot axis is positioned parallel to the rail. A third step involves positioning the rail grooming head on the rail. A fourth step involves moving the trolley parallel to the rail while maintaining the rail grooming head in working contact with the rail. The primary pivot axis accommodates limited vertical movement of the trolley relative to the rail.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 2:
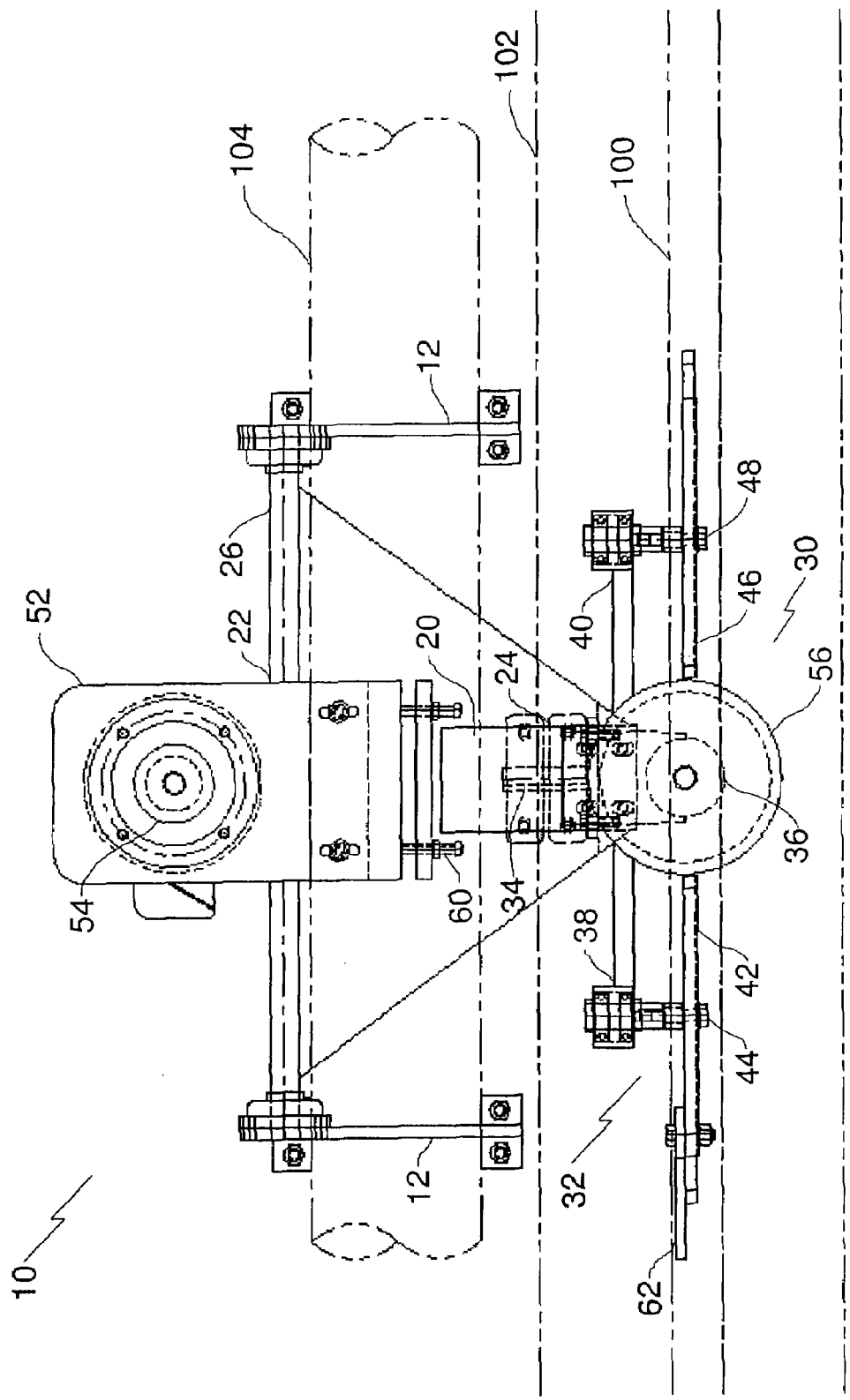
FIG. 2 is a top plan view of the rail grooming machine illustrated in FIG. 1.
Figure 3:
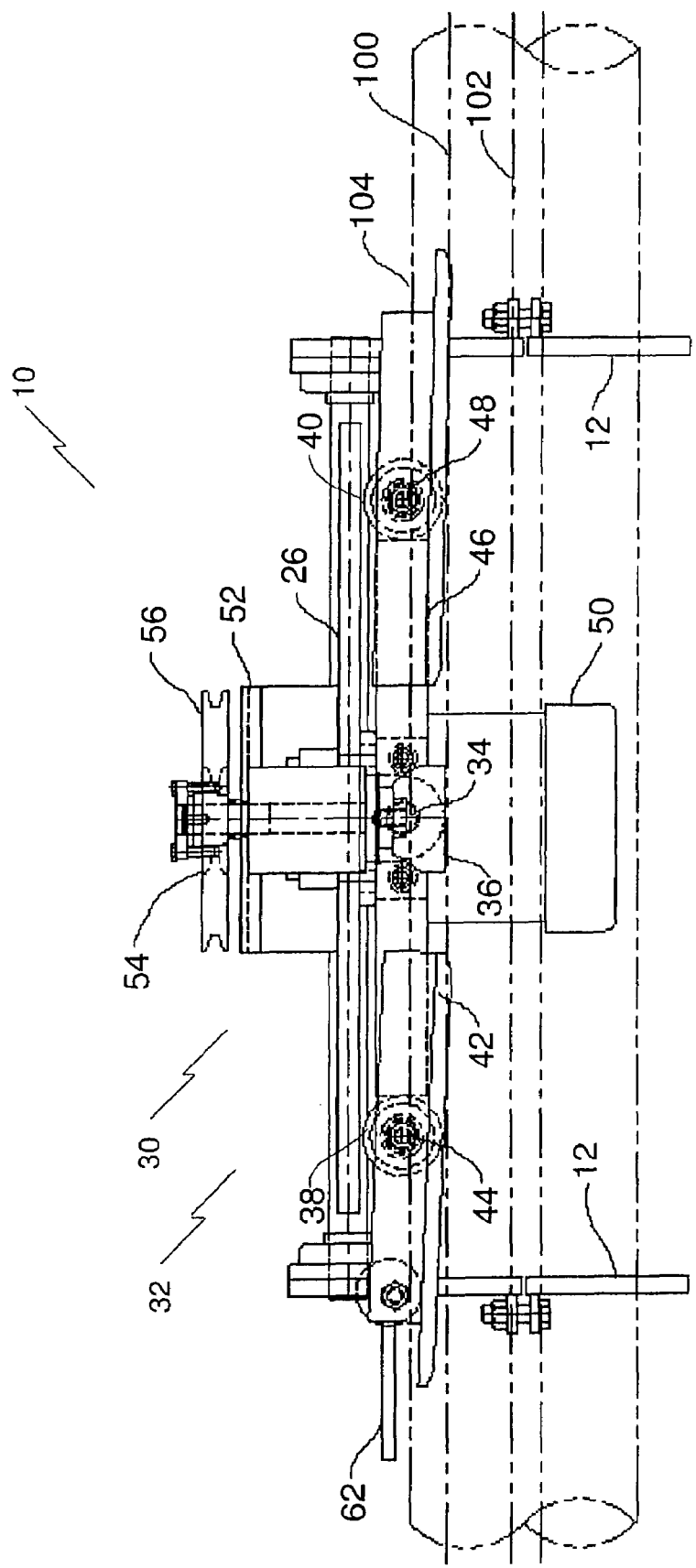
FIG. 3 is a front elevation view of the rail grooming machine illustrated in FIG. 1.

The preferred embodiment, a rail grooming machine generally identified by reference numeral 10, will now be described with reference to FIG. 1 through FIG. 3.

Figure 1:
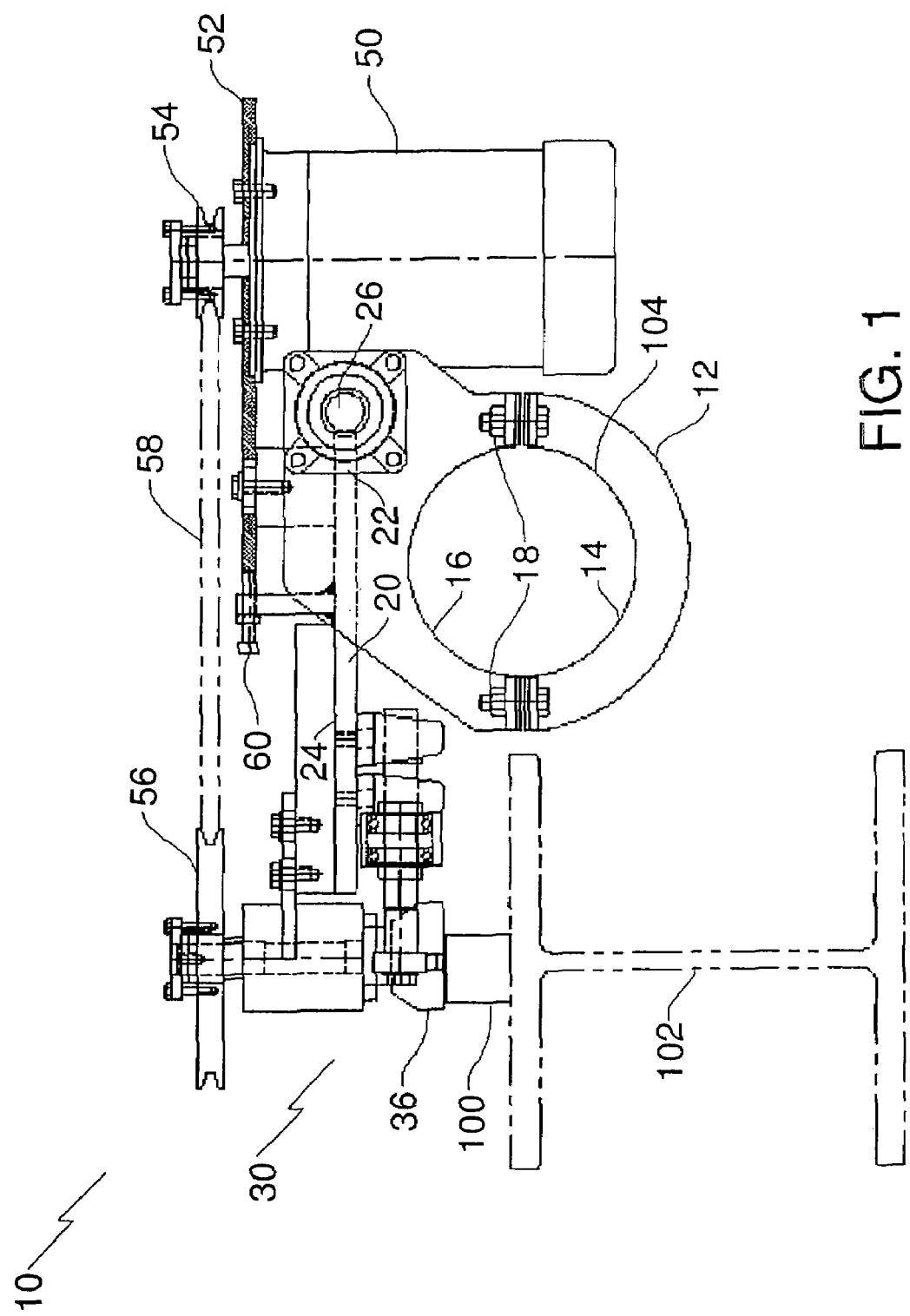
FIG. 1 is an end elevation view of a rail grooming machine constructed in accordance with the teachings of the present invention.

Structure and Relationship of Parts:

Referring to FIG. 1, rail grooming machine 10 has a mounting body generally indicated by reference numeral 12. Mounting body 12 consists of two clamping sections 14 and 16. As will hereinafter be further described in the description of operation, sections 14 and 16 are adapted to clamp around an object. Sections 14 and 16 are, preferably, maintained in this clamping relationship by fasteners 18, which in FIG. 1 are illustrated as being nuts and bolts. Referring to FIG. 1 and FIG. 2, a support 20 is provided having a first end 22 and a second end 24. First end 22 of support 20 is pivotally secured to mounting body 12 for pivotal movement about a substantially horizontal primary pivot axis, represented by shaft 26. A rail grooming head, generally indicated by reference numeral 30, is mounted to second end 24 of support 20. Referring to FIG. 2 and FIG. 3, rail grooming head 30 includes a walking beam assembly, generally identified by reference numeral 32. Walking beam assembly 32 pivots about a substantially horizontal secondary pivot axis, represented by stub shaft 34. Stub shaft 34 (the second pivot axis) is positioned substantially perpendicular to shaft 26 (the primary pivot axis). A rail grooming tool 36 is centrally positioned relative to walking beam assembly 32. Walking beam assembly 32 has a first end 38 and a second end 40. A first shoe 42 is pivotally mounted at first end 38 of walking beam assembly 32 for pivotal movement about a substantially horizontal pivot axis, represented by pivot bolt 44. Pivot bolt 44 is parallel to stub shaft 34 (the secondary pivot axis). A second shoe 46 is pivotally mounted at second end 40 of walking beam assembly 32 for pivotal movement about a substantially horizontal pivot axis, represented by pivot bolt 48. Pivot bolt 48 is also parallel to stub shaft 34 (the secondary pivot axis).

It is preferred that rail grooming tool 36 is a milling cutter. It will be appreciated that there are various types of rail grooming tools which may be used. The prior art appears to make reference to the use of grinders. While a grinder may be effective for some applications, the results obtained when using a grinder in this application were not up to expectations. A single day usage using a milling cutter exceeded the results obtained after ten days of using the grinder. Referring to FIG. 1, rail grooming tool 36 (the milling cutter) is driven by a motor 50. Motor 50 is secured to a motor mounting plate 52, which forms part of support 20. Motor 50 rotates a first pulley 54 which serves as a driving pulley. A second pulley 56, which serves as a driven pulley, rotates with rail grooming tool 36 (the milling cutter). A V-Belt 58 couples first pulley 54 and second pulley 56 to establish a drive connection between motor 50 and rail grooming tool 36 (the milling cutter). The relative distance between first pulley 54 and second pulley 56 is adjustable, by means of V-belt drive tension adjustment screw 60. Referring to FIG. 2 and FIG. 3, a cam lever 62 is provided for selectively raising walking beam assembly 32.

Operation:

The use and operation of rail grooming machine 10 will now be described with reference to FIG. 1 through FIG. 3. Rail grooming machine 10 is shown in its working environment. FIG. 1 shows crane rail 100, positioned on crane support beam 102. FIG. 2 shows a pipe framework 104. Pipe framework 104 is part of a trolley portion of the crane, which travels parallel to rail 100. Referring to FIG. 1, in preparation for use, mounting body 12 is mounted to pipe framework 104 of the trolley portion of the crane. In the preferred embodiment, this is accomplished by placing section 14 and 16 around pipe framework 104 and clamping sections 14 and 16 together with fasteners 18 (nuts and bolts). Care is taken to ensure that mounting body 12 is mounted in such a fashion that shaft 26 (the primary pivot axis) is positioned parallel to rail 100. It has been found that it is easier to mount if rail grooming tool 36 (the milling cutter), walking beam assembly 32 and motor 50 are removed. Once mounting body 12 is mounted, levelled and correctly aligned relative to rail 100; rail grooming tool 36 (the milling cutter), walking beam assembly 32 and motor 50 are reattached. The distance between first pulley 54 and second pulley 56 is then adjusted using V-belt drive tension adjustment screw 60. Rail grooming head 30 is then positioned on rail 100. Care is taken to level rail grooming tool 36 (the milling cutter) using a level, feeler gauges and shims. The overhang distance for rail grooming tool 36 (the milling cutter) is adjusted to that the entire top surface of rail 100 is covered, while leaving sufficient clearance to pass the support pillars for the crane structure while traversing rail 100. It is preferred that a slow "test run" be conducted from one end of rail 100 to the other to ensure that rail grooming head 30 will clear all potential obstructions. A decision is then made as to the direction of travel during cutting, which has been indicated in FIG. 3 by arrow 106. A five thousandth shim is used to raise second end 40 of walking beam assembly 32. This tilts rail grooming tool 36 (the milling cutter), so that only the leading edge engages rail 100. This is done to reduce chatter and improve the smoothness of the finish. The depth of cut of rail grooming tool 36 (the milling cutter) must also be adjusted. It is preferred that the depth be 0.005 inches to 0.010 inches below the first shoe 42 and second shoe 46 of walking beam assembly 32, so that only the high spots are milled off. Cam lever 62 is then used to raise walking beam assembly 32 so that rail grooming tool 36 (the milling cutter) is not touching rail 100. It is critical that there be a communication link with the crane operator. The operator should be instructed to place the trolley in motion at approximately four feet per minute. Once the trolley is in motion cam lever 62 is slowly released to lower walking beam assembly 32 onto rail 100. If rail grooming tool 36 (the milling cutter) were operating in contact with rail 100 prior to the trolley being set in motion, there is a risk that a circular hole would be formed in rail 100. It is, therefore, desirable that the trolley be in motion prior to rail grooming tool 36 (the milling cutter) being placed in operational and that rail grooming tool 36 (the milling cutter) engage rail 100 gradually. The trolley, of which pipe framework 104 forms a part, is then moved slowly parallel to rail 100 while maintaining rail grooming head 30 remains in working contact with rail 100. It is preferred that, upon reaching the end of rail 100, the rail grooming head 30 be lifted and that you return to the starting position, so that the feed is always in one direction. Support 20 pivots about shaft 26 (the primary pivot axis) to accommodate limited vertical movement of the trolley relative to rail 100 during such movement. This pivotal movement prevents the trolley vertical movement from adversely affecting the performance of rail grooming head 30. Rail 100 will have developed high spots and low spots. Walking beam assembly 32 assists in adjusting rail grooming tool 36 (the milling cutter) to accommodate such high spots and low spots. When a high spot is encountered by second shoe 46, walking beam assembly 32 pivots about stub shaft 34 (the secondary pivot axis). This raises rail grooming tool 36 (the milling cutter), so that only a portion of the high spot is removed. On each subsequent pass more and more of the high spot will be removed, until the high spot has been removed entirely. The first shoe 42 and second shoe 46 are long enough and spaced in a sufficiently wide stance that rail rooming tool 36 (the milling cutter) does not fall into low spots. It can be seen from this how walking beam assembly 32 reduces vertical movement of the rail grooming tool 36 (the milling cutter) caused by an uneven surface on rail 100. Should there be an increase in noise or vibration, this could be an indication that you should reduce the speed of travel of the trolley or it could be an indication that you should check for wear on rail grooming tool 36 (the milling cutter). If there is no sufficient engagement between rail grooming tool 36 (the milling cutter) and rail 100, add weight to second end 24 of support 20.

Figure 4:
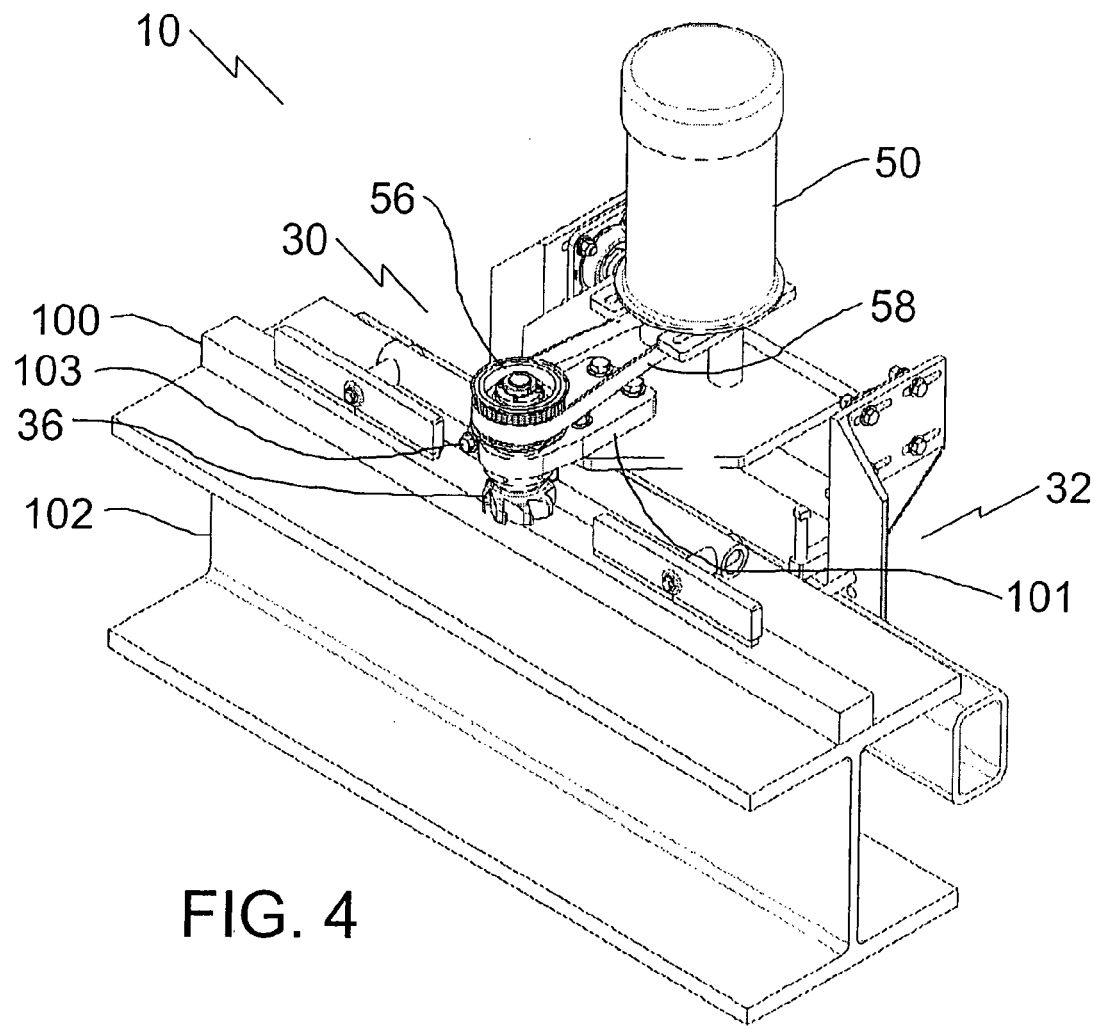
FIG. 4 is a perspective view of a variation of the rail grooming machine illustrated in FIG. 1.
Figure 5:
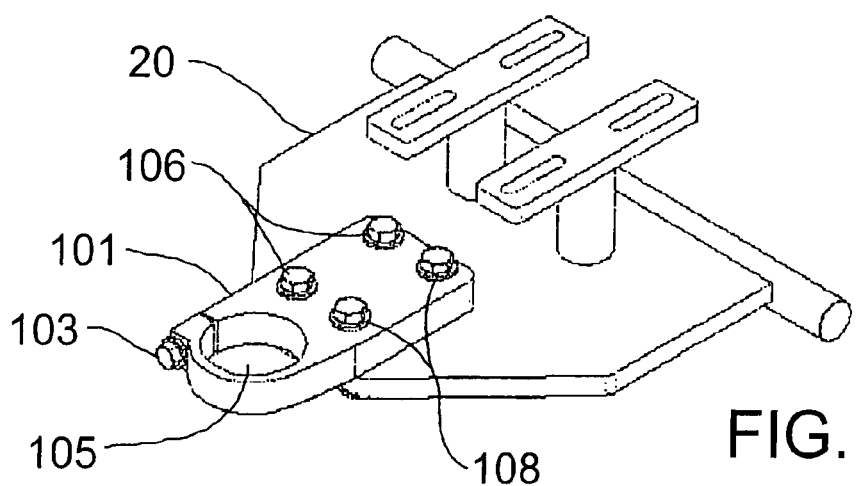
FIG. 5 is a perspective view of a mounting block used in the rail grooming machine illustrated in FIG. 4.
Figure 6:
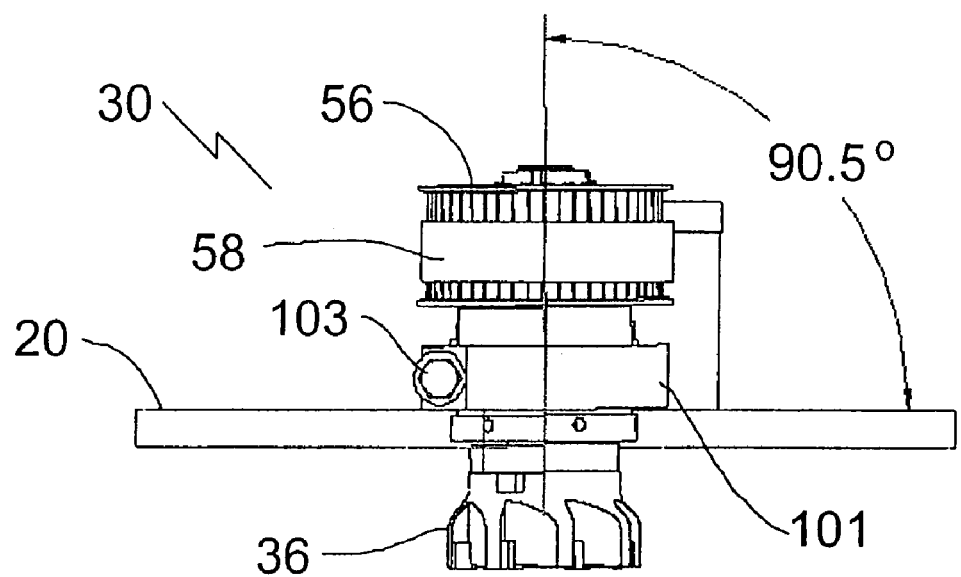
FIG. 6 is a front elevation view of the grooming head of the rail grooming machine illustrated in FIG. 1 tilted to the left.
Figure 7:
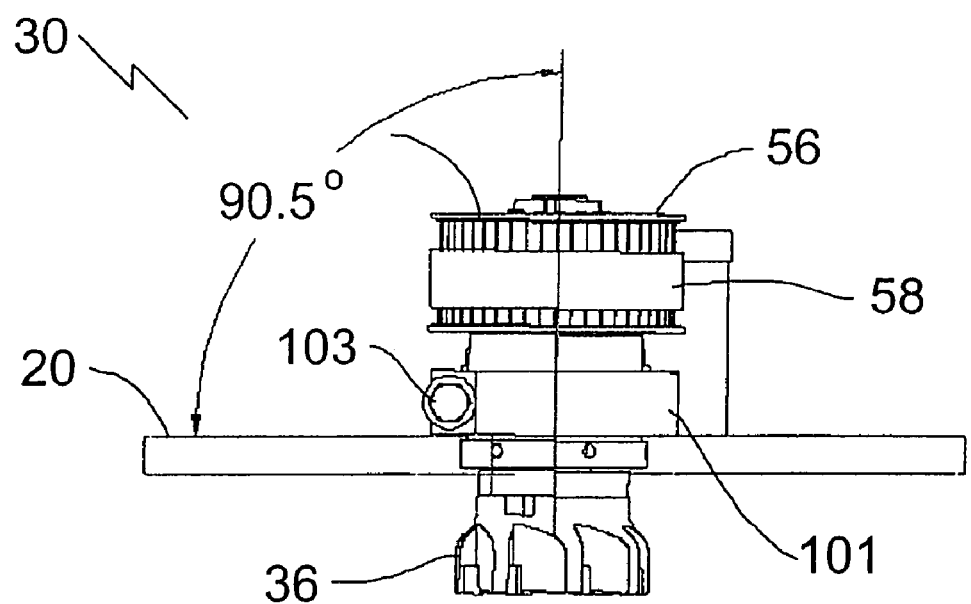
FIG. 7 is a front elevation view of the grooming head of the rail grooming machine illustrated in FIG. 1 tilted to the right.

Variation:

Referring now to FIGS. 4 through 7, rail grooming machine 10 may also be adapted to allow for bi-directional grooming. Referring to FIG. 4, grooming head mounting block 101 is included with a clamp bolt 103. Referring to FIGS. 4 and 5, the vertical adjustment of grooming head 30 may be adjusted by loosening clamp bolt 103 which in turn loosens clamp 105, and rotating it. Grooming head 30 is threaded (threads not illustrated), such that it is moved up or down until the desired position is reached. Clamp bolt 103 is then tightened again to secure grooming head 30 in clamp 105. Referring to FIG. 5, mounting block 101 is attached to support 20 by bolts 106 on the left side, and bolts 108 on the right. When it is desired to groom to the left, bolts 108 are loosened, and bolts 106 are fully tightened to seat mounting block toward the left. Bolts 108 are then tightened to remove vibrations, but not enough to shift mounting block 101 from its seated position, such that grooming head 30 is at a slight angle to the left, as shown in FIG. 6. When it is desired to groom to the right, bolts 106 are loosened, and bolts 108 are fully tightened to seat mounting block 101 toward the right. Bolts 106 are then tightened to reduce vibrations, but not enough to shift mounting block 101 from its seated position, such that grooming head 30 is at a slight angle to the right, as shown in FIG. 7. In FIGS. 6 and 7, grooming head 30 is shifted 0.5 degrees off the normal.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

What is claimed is:

1. An apparatus, comprising:
   a mounting body;
   a support having a first end and a second end, the first end of the support being pivotally secured to the mounting body for pivotal movement about a substantially horizontal primary pivot axis; and
   a rail grooming head mounted to the second end of the support;
   wherein the rail grooming head includes a walking beam assembly that pivots about a substantially horizontal secondary pivot axis positioned substantially perpendicular to the primary pivot axis with a rail grooming tool; and
   wherein the walking beam assembly has a first end and a second end, a first shoe being pivotally mounted at the first end for pivotal movement about a substantially horizontal pivot axis parallel to the secondary pivot axis and a second shoe pivotally mounted at the second end for pivotal movement about a substantially horizontal pivot axis parallel to the secondary pivot axis.

2. The apparatus as defined in claim 1, wherein the mounting body has two clamping sections with means for securing the two clamping sections around an object.

3. The apparatus as defined in claim 1, wherein the rail grooming head includes a milling cutter.

4. The apparatus as defined in claim 1, wherein the walking beam assembly assists in adjustment of the rail grooming tool.

5. The apparatus as defined in claim 1, wherein the first shoe and the second shoe are spaced on opposite sides of the rail grooming tool.

6. The apparatus as defined in claim 1, wherein means are provided for selectively raising the walking beam assembly.

7. An apparatus, comprising:
   a mounting body including two clamping sections with means for securing the two clamping sections around an object;
   a support having a first end and a second end, the first end of the support being pivotally secured to the mounting body for pivotal movement about a substantially horizontal primary pivot axis; and
   a rail grooming head mounted to the second end of the support, the rail grooming includes a walking beam assembly that, via a stub shaft, pivots about a substantially horizontal secondary pivot axis positioned substantially perpendicular to the primary pivot axis with a rail grooming tool, the walking beam assembly has a first end and a second end, a first shoe being pivotally mounted at the first end for pivotal movement about a substantially horizontal pivot axis parallel to the secondary pivot axis and a second shoe pivotally mounted at the second end for pivotal movement about a substantially horizontal pivot axis parallel to the secondary pivot axis.

8. The apparatus as defined in claim 7, wherein the rail grooming tool is a milling cutter.

9. The apparatus as defined in claim 7, wherein a cam lever is provided for selectively raising the walking beam assembly.

* * * * *